Oct. 7, 1930.  S. B. WINN  1,777,422
AUTOMOBILE TRANSPORTING TRAILER
Filed May 31, 1929  2 Sheets-Sheet 1
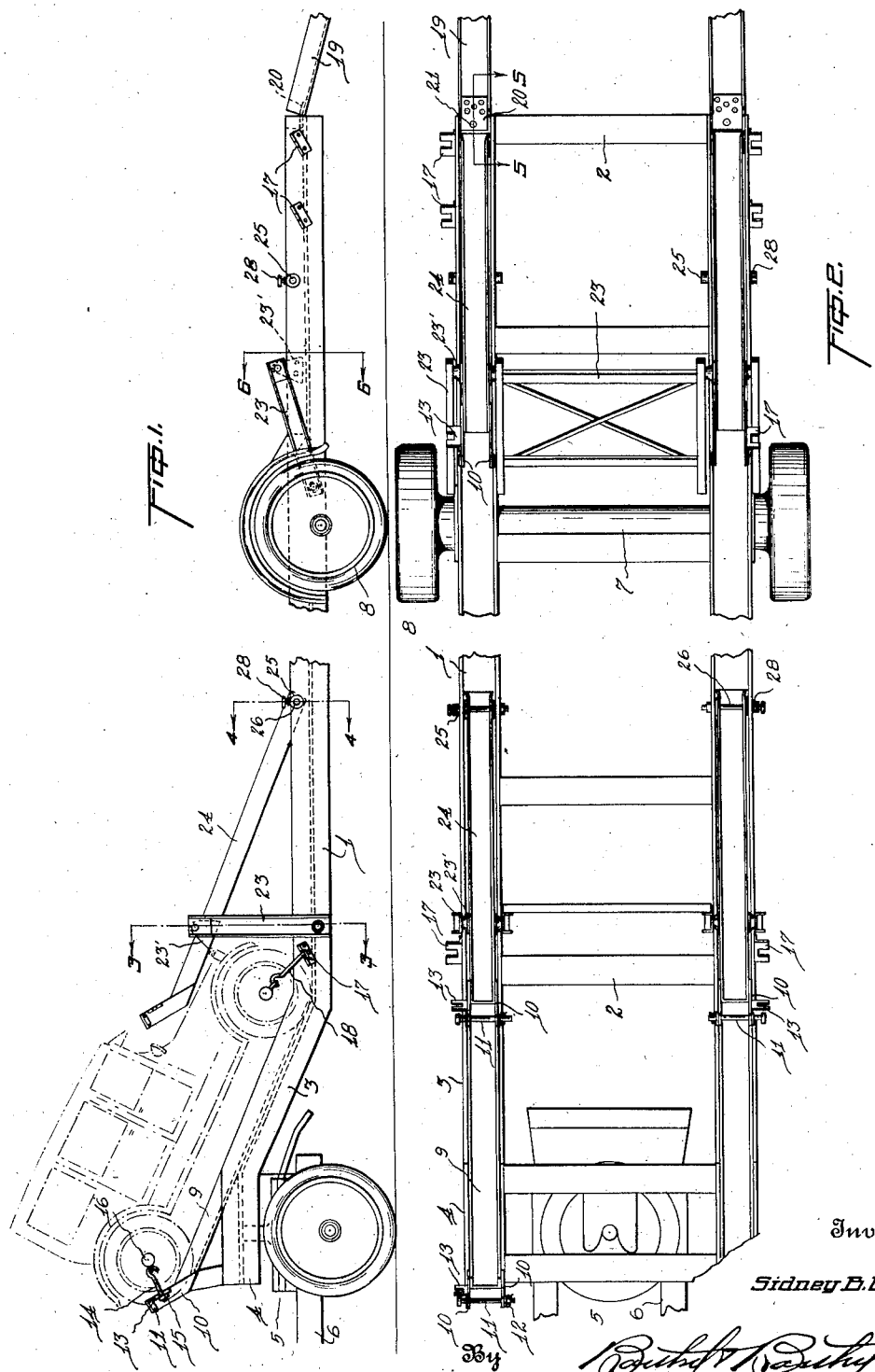

Oct. 7, 1930.    S. B. WINN    1,777,422
AUTOMOBILE TRANSPORTING TRAILER
Filed May 31, 1929    2 Sheets-Sheet 2
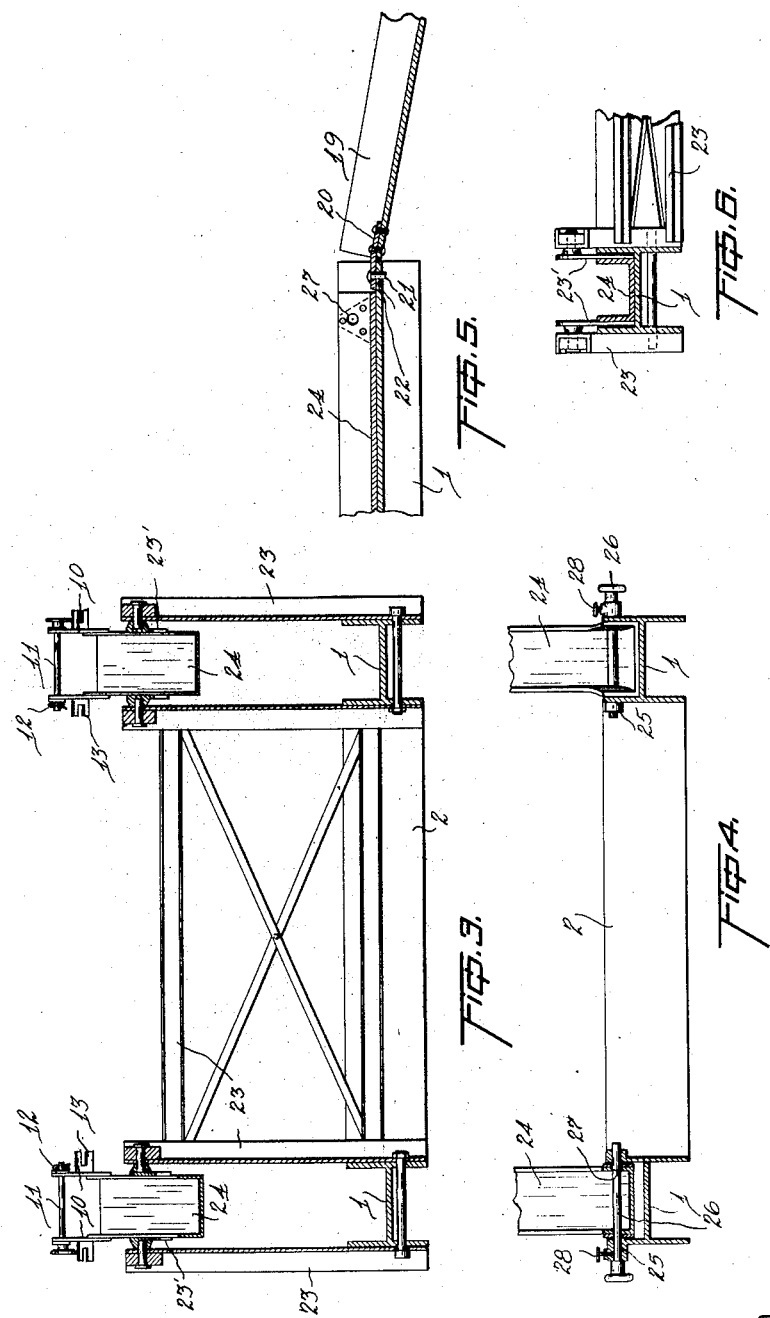
Inventor
Sidney B. Winn
By
Attorney Patented Oct. 7, 1930

1,777,422

UNITED STATES PATENT OFFICE

SIDNEY B. WINN, OF LAPEER, MICHIGAN

AUTOMOBILE TRANSPORTING TRAILER

Application filed May 31, 1929. Serial No. 367,208.

The present invention pertains to novel vehicle transporting equipment and has special reference to automobile transporting trailers and the like.

A primary object of the present invention is to devise an automobile transporting vehicle in the nature of a trailer constructed to facilitate the packing of automobiles under their own power in an angularly superposed relation. Automobiles, in being transported from one factory to another or to show rooms, are often the subject of comparatively short hauls in which case the amount of inconvenience and laborious handling necessary due to the limitations of ordinary trailers or trucks runs into considerable expense which is greatly reduced by the mechanism and equipment incorporated in the present invention which facilitates the angular decking of the automobiles. The reason for the reduction of expenses is principally due to the fact that the angularly superposed automobiles on the trailer occupy a minimum amount of space and the labor of loading and unloading is greatly simplified by permitting the loading of the automobiles under their own power of locomotion. In other words, the carrying facilities of the trailer constructed in accordance with the present invention are greater than ordinarily found in trucks or trailers of a corresponding length and thereby the cost of transporting automobiles in quantities is materially decreased.

Another object of the present invention is to devise a trailer having knock-down runways or ramps which permit a systematic loading of the automobiles and serve to maintain the loaded automobiles in an angular position where they are positively locked by a mechanism which prevents their accidental displacement which otherwise might be caused by irregularities in the road surface during travel. The knock-down ramps and the locking means attain the greatest possible degree of simplicity in operation coupled with the highest degree of efficiency which readily permit a systematic loading of the automobiles under their own motive power without the removal of any parts therefrom. This obviously is a very desirable feature inasmuch as it leaves them in working condition ready for delivery to a customer immediately they are unloaded, the unloading also being done under their own power of locomotion.

With the above and other objects in view, the present invention consists in the matters hereinafter set forth and more particularly pointed out in the appended claims, reference being had to the accompanying drawings, in which Figure 1 is a broken side elevation of a trailer constructed in accordance with the present invention and illustrating the rear portion of a tractor;

Fig. 2 is a plan projection of Fig. 1;

Fig. 3 is a transverse cross sectional view on the line 3—3 of Fig. 1;

Fig. 4 is a transverse cross sectional view on the line 4—4 of Fig. 1;

Fig. 5 is a cross sectional view of a rear portion of the trailer substantially on the line 5—5 of Fig. 2, and Fig. 6 is a transverse cross sectional view on the line 6—6 of Fig. 1.

Like characters of reference are employed throughout to designate corresponding parts.

The side members 1 constituting the main members forming the present trailer are, as clearly illllustrated in the drawings, H-shaped in cross section and are joined together by cross beams 2 positioned at convenient intervals and thereby serve to maintain the two members in a definite spaced relation corresponding to the spacing of the wheels of a conventional automobile. The forward end of the frame members 1 are inclined upwardly as at 3 and formed with an extending portion 4 which is parallel to the lower portion 1, to serve, in addition to a purpose presently to be described, as a supporting means for the attachment of a conventional tractor trailer connecting mechanism indicated generally by the numeral 5 for the purpose of connecting the trailer to a tractor 6. This construction which forms the skeleton of the trailer is all constructed of metal and an axle 7 is secured thereto for accommodation of the wheels 8.

To the skeleton thus constructed there is attached a plurality of ramps, certain of which are knock-down in nature. The ramp at the forward extremity in order to utilize a maximum amount of space is made permanent and projects upwardly above the overhanging or extending portion 4 of the frames 1. This ramp is formed of channel members 9 which are received and secured in the upper grooves of the H-shaped members 1 at the upward inclination 3 to extend upwardly beyond the frame and the end of this extending portion is provided with two arms 10 extending angularly therefrom. The outer ends of the arms 10 are provided with drilled holes to accommodate a bolt 11 having a cotter pin 12 to maintain it in a position where it serves as an abutment to prevent an automobile whose wheels are in the channel members 9 from being driven over the end of the latter. This is clearly illustrated in Fig. 1 of the drawings where the automobile is shown in broken lines. The arms 10 further support brackets 13 which are slotted to accommodate the hooked bolts 14 having adjustable nuts 15, the hook portion connecting to a cap member 16 which is placed over the hub cap of the automobile wheel. Brackets 17 which are similar to the brackets 13 are attached to the frame 1 and accommodate similar hooked bolts 18. It is obvious that these bolts will securely connect the hub caps of the automobile to the frame work of the trailer in such a manner as to prevent its accidental displacement.

Skid members 19 are provided to permit an automobile to be backed onto the trailer and to guide the wheels into the upper channels of the members 1. Each skid comprises a channel iron having one end flared and adapted to rest upon the ground and the opposite end provided with a plate 20 secured to the channel member by rivets or bolts to protrude therefrom in the nature of a tongue. This tongue is inserted in the upper channel of the H-shaped member 1, the former being provided with a pin 21 which projects into a drilled hole 22 in the H-shaped member 1 and serves as a connection which prevents the skid members from being accidentally displaced, yet which readily permits their removal.

A plurality of pivotal knock-down ramps are provided and each comprises the pivoted supporting frame 23 to which is pivoted saddle members 23' at the upper end to support the tread members or ramps 24 which are formed of channel members flared outwardly at their lower ends, the flared portion resting in the upper channel in the member 1. The upper end of each ramp is provided with arms 10, a bolt 11 and brackets 13 identical with that previously described in reference to the permanent ramp. The frames 1 are bossed and drilled as at 25 to accommodate a bolt 26 which is adapted to be passed through openings 27 in the lower ends of the members 24, a set screw 28 being provided to prevent accidental displacement of the bolt 26. The drilled holes 25 and the openings 27 register to permit the bolt 26 to be inserted in the above described manner only when the supporting frame 23 is in a vertical position. It will be observed in the drawings that the frame 23 may be swung on its pivots so that the saddles 23' permit the ramps 24 to nest into the upper channel of the H-shaped members 1 when the bolt 26 has been removed.

In order to load automobiles upon the device thus described, the knock-down ramps comprising the pivoted frames 23, the saddles 23' and the ramps proper 24 are collapsed so that the channel members forming the ramps 24 are nested in the upper channel of the H-shaped member 1. The skids 19 are then put in place with the pins 21 in the openings 22 permitting an automobile to be backed rearwardly up the skids 19, along the members 1, passing over the nested channel ramps 24 and thence up the ramp 9 until the rear wheels butt against the bolts 11. The caps 16 are then secured to the hub of the automobile wheels and the bolts 14 and nuts 15 connect the brackets 13 and the caps 16 so that the automobile will be retained in this position. The brackets 17 and hooked bolts 18 are then connected to the caps secured to the front wheel hubs and thereby any movement of the automobile through jolts or jars to which the trailer might be subjected to in travel is positively prevented.

The second stage of loading is to raise the next knock-down ramp and to put in place the bolts 11 in the arms 10 on the member 24 which have been removed to permit the loading of the first automobile. The frame 23 is then swung upon its pivots and assumes an upright position which brings the openings 27 to a point where they register with the drilled holes 25 and permit the insertion of the bolts 26 which maintain the ramps 24 in an angular position which permits another automobile to be backed on and secured in the manner previously described. This system of loading is then performed with the next ramp and so on until all the knock-down ramps have been raised and loaded.

From the foregoing description it will become apparent that the knock-down ramps which are never removed from the trailer, afford great convenience in loading and in unloading. The entire construction with the exception of the skids, is formed as a unit which eliminates all superfluous parts and accessories and thereby attains the greatest possible degree of efficiency in trailers or trucks of this character.

The description has set forth an embodiment of the present invention which for the sake of clarity is confined to a system of loading automobiles upon the vehicle by backing them into place. It is quite obvious, however, that by increasing the distance between the ramps that the automobiles may be driven into place forwardly. In the case of a roadster or touring type of automobile the present construction will serve as efficiently to economize in the amount of space used by running the automobiles into place forwardly as well as rearwardly.

Although a specific embodiment of my invention has been illustrated and described, it is to be understood that various alterations may be made in the details of construction without departing from the spirit of the invention as depicted in the following claims.

What I claim is:—

1. In an automobile transporting trailer, a frame formed with an angularly inclined ramp at its forward end, and a plurality of knock-down ramps pivoted at intervals to said frame whereby automobiles may be loaded on said ramps without removing the latter from said frame.

2. In an automobile transporting trailer, a frame formed with an angularly inclined ramp at its forward end, a plurality of knock-down ramps pivoted at intervals to said frame, said knock-down ramps being adapted to nest into said frame members when in a knock-down position.

3. In an automobile transporting trailer, a frame formed with an angularly inclined ramp adapted to maintain an automobile in a position with its wheels at one end in an elevated position relative to the wheels at the other end, and a plurality of knock-down ramps pivoted to said frame whereby the ramps may be moved on their pivots in a manner permitting successive loading of automobiles on said ramps.

4. In an automobile transporting trailer, a frame formed with an angularly inclined ramp adapted to maintain an automobile in a position with its wheels at one end in an elevated position relative to the wheels at the other end, a plurality of knock-down ramps pivoted to said frame, said knock-down ramps being adapted to nest into said frame members when in a knock-down position to permit an automobile to be driven onto said first named ramp.

5. In an automobile transporting trailer, a frame formed with an angularly inclined ramp adapted to maintain an automobile in a position with its wheels at one end in an elevated position relative to the wheels at the other end, a plurality of knock-down ramps pivoted to said frame, said knock-down ramps being adapted to support automobiles when in an upright position so that the elevated wheels overhang a portion of the automobile supported on the next ramp and adapted to be moved on their pivots to a position where automobiles may be moved over the same during the loading and unloading operation.

6. In an automobile transporting trailer, a frame formed with an overhanging front portion adapted to support a coupling mechanism, an angular ramp permanently secured to said overhanging portion, and a plurality of knock-down ramps pivoted to said frame and adapted to be received in said frame in a manner permitting automobiles to be driven over the ramps when the latter are in a knock-down position.

7. In an automobile transporting trailer, a frame formed with an overhanging front portion adapted to support a coupling mechanism, an angular ramp permanently secured to said overhanging portion, a plurality of knock-down ramps pivoted to said frame, said knock-down ramps being adapted to nest into said frame members when in a knock-down position.

8. In an automobile transporting trailer, a frame formed with an overhanging front portion adapted to support a coupling mechanism, an angular ramp permanently secured to said overhanging portion and adapted to support an automobile in a position with its wheels at one end elevated in relation to the wheels at the other end, and a plurality of knock-down ramps pivoted to said frame and adapted to move on said pivots to a position permitting automobiles to be driven over the same during the loading and unloading operations.

9. In an automobile transporting trailer, a frame formed with an overhanging front portion adapted to support a coupling mechanism, an angular ramp permanently secured to said overhanging portion and adapted to support an automobile in a position with its rear wheels at one end elevated in relation to the wheels at the other end, a plurality of knock-down ramps pivoted to said frame, said knock-down ramps adapted to nest into said frame members when in a knock-down position.

10. In an automobile transporting trailer, a frame formed with an overhanging front portion adapted to support a coupling mechanism, an angular ramp permanently secured to said overhanging portion and adapted to support an automobile in a position with its wheels and one end elevated in relation to the wheels at the other end, a plurality of knock-down ramps pivoted to said frame, said knock-down ramps adapted to nest into said frame members when in a knock-down position to permit an automobile to be driven onto said first named ramp, and means for locking said automobile from accidental removal from said ramp.

11. In an automobile transporting trailer, a frame formed with an overhanging front portion adapted to support a coupling mechanism, an angular ramp permanently secured to said overhanging portion and adapted to support an automobile in a position with its wheels at one end elevated in relation to the wheels at the other end, a plurality of knock-down ramps pivoted to said frame, said knock-down ramps being adapted to support automobiles when in an upright position so that the elevated wheels overhang a portion of the automobile supported on the next ramp and further adapted to be moved pivotally to a position permitting automobiles to be driven over the same during loading and unloading operations, and means for locking said automobiles on said ramps to prevent their accidental removal therefrom.

In testimony whereof I affix my signature.

SIDNEY B. WINN.